United States Patent [19]
Jeganathan et al.

[11] Patent Number: 5,844,700
[45] Date of Patent: Dec. 1, 1998

[54] SPATIO-ANGULAR MULTIPLEXING GEOMETRY FOR VOLUME HOLOGRAPHIC STORAGE

[75] Inventors: Muthuveerappan Jeganathan, Thousand Oaks; Matthew C. Bashaw, Menlo Park; Lambertus Hesselink, Woodside, all of Calif.

[73] Assignee: The Board of Trustees of the Leland Stanford Junior University, Stanford, Calif.

[21] Appl. No.: 685,513

[22] Filed: Jul. 24, 1996

[51] Int. Cl.⁶ .............. G02B 1/02; G02B 1/26; G11B 7/00
[52] U.S. Cl. ............. 359/7; 359/22; 369/103
[58] Field of Search .............. 359/22, 24, 35, 359/3, 4, 7; 365/125; 369/103, 109

[56] References Cited

U.S. PATENT DOCUMENTS

| | | | |
|---|---|---|---|
| 3,737,878 | 6/1973 | Gamblin et al. | 359/22 |
| 4,017,144 | 4/1977 | Staebler | 359/24 |
| 4,295,162 | 10/1981 | Carlsen | 369/44.19 |
| 4,449,785 | 5/1984 | Huignard et al. | 359/24 |
| 5,111,313 | 5/1992 | Shires | 359/22 |
| 5,450,218 | 9/1995 | Heanue et al. | 359/22 |

*Primary Examiner*—Jon Henry
*Attorney, Agent, or Firm*—Lumen Intellectual Property Services

[57] ABSTRACT

Partially overlapping holograms are stored in a cylindrical volume holographic storage medium capable of rotation about and translation along its longitudinal axis. The reference and signal beams are mutually perpendicular, and each is perpendicular to the longitudinal axis. An index-matched housing encloses the medium laterally. An optional helically-varying optical axis (c-axis) orientation allows recording at constant angular intervals over a full revolution. Signals from stored pages are used to dynamically adjust the positioning of the medium relative to the light beams as the medium continuously spins at high velocity, and to control the access of the signal beam to the readout camera.

13 Claims, 5 Drawing Sheets

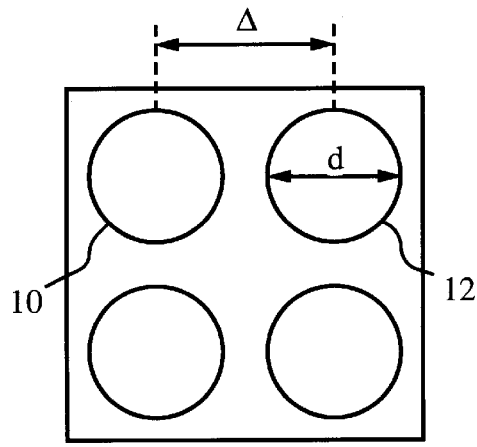
FIG. 1-A
PRIOR ART
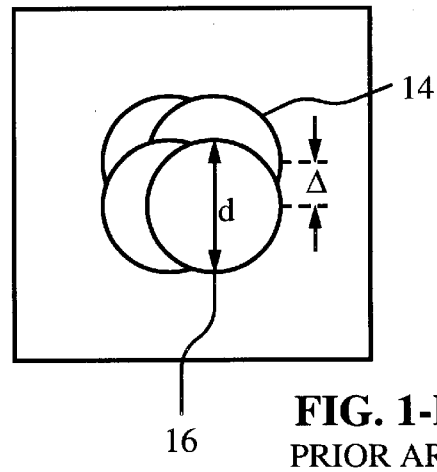
FIG. 1-B
PRIOR ART
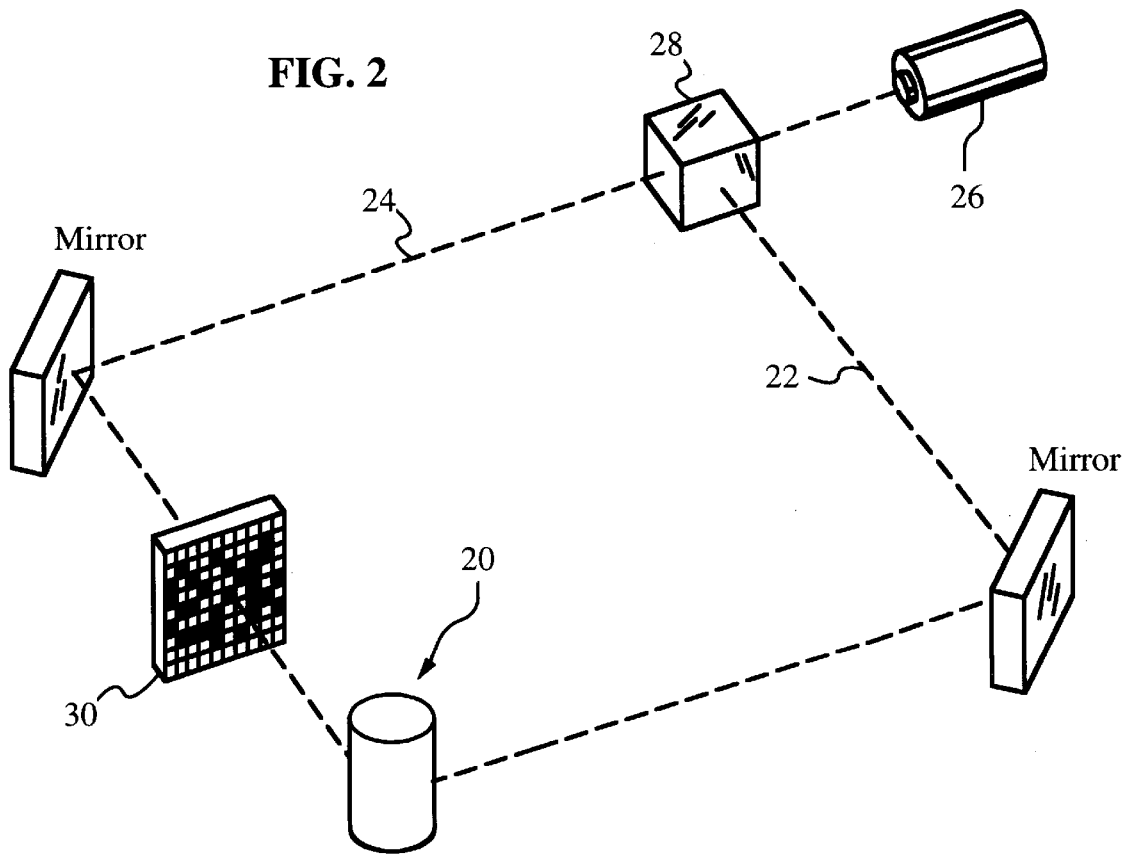
FIG. 2

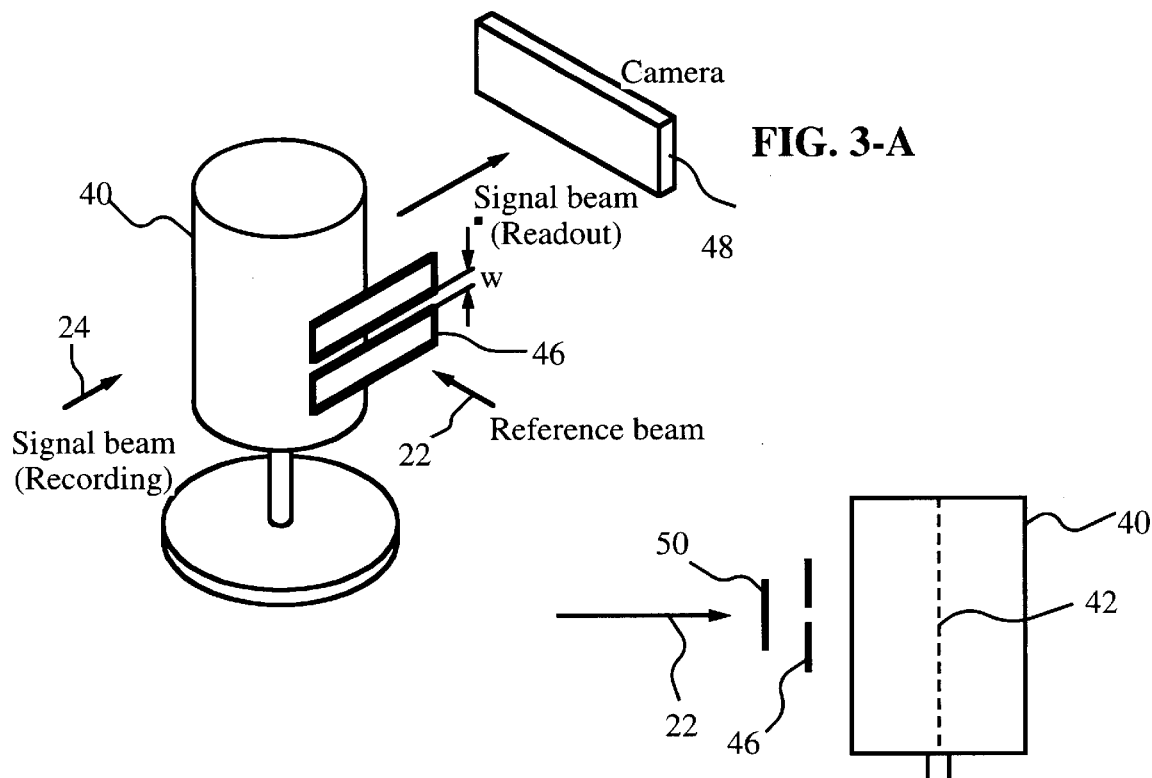
FIG. 3-A
FIG. 3-B
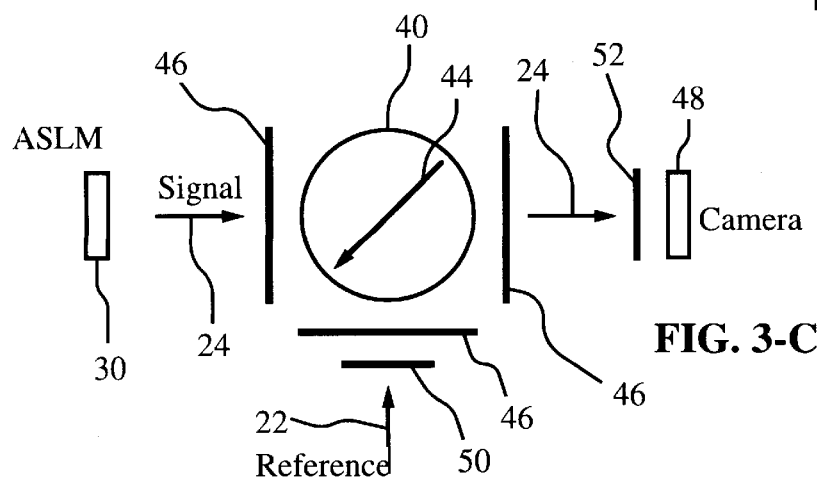
FIG. 3-C

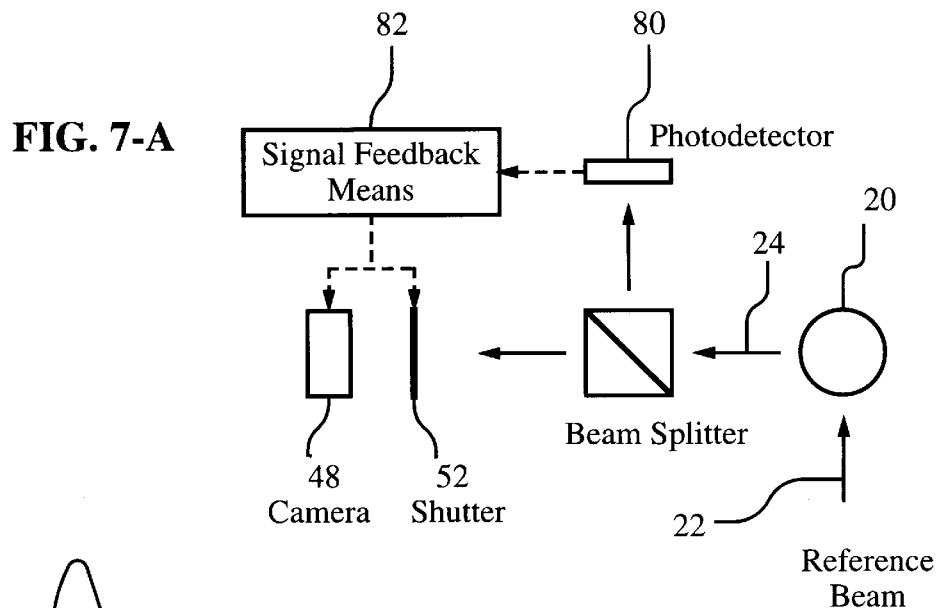
FIG. 7-A
FIG. 7-B
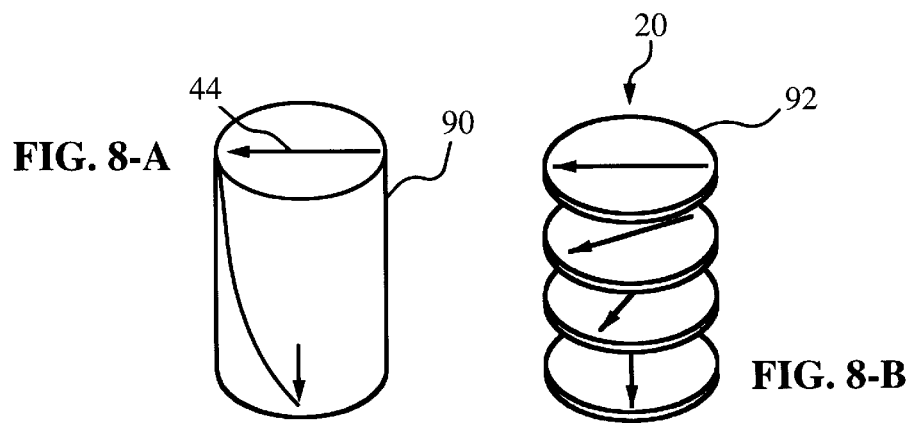
FIG. 8-A
FIG. 8-B

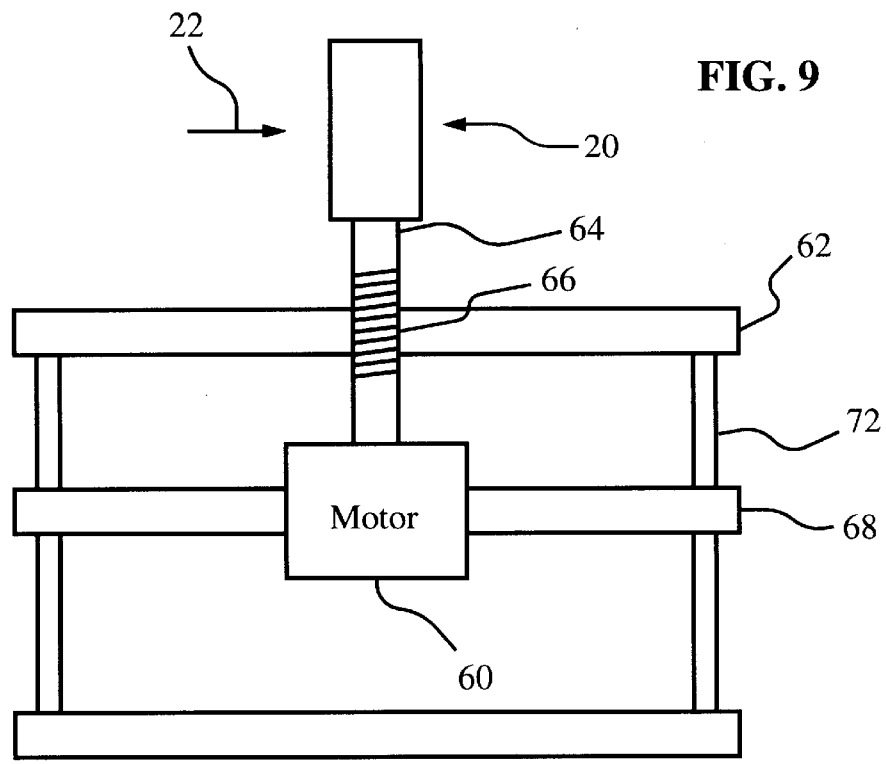
FIG. 9
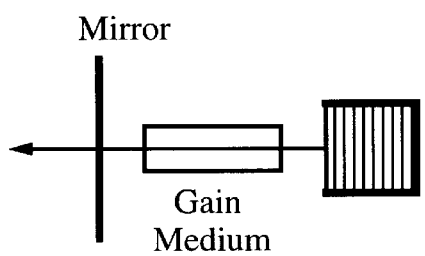
FIG. 10-A
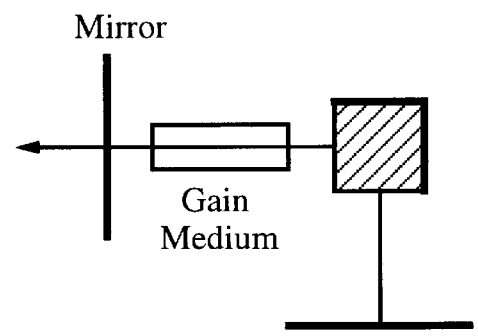
FIG. 10-B
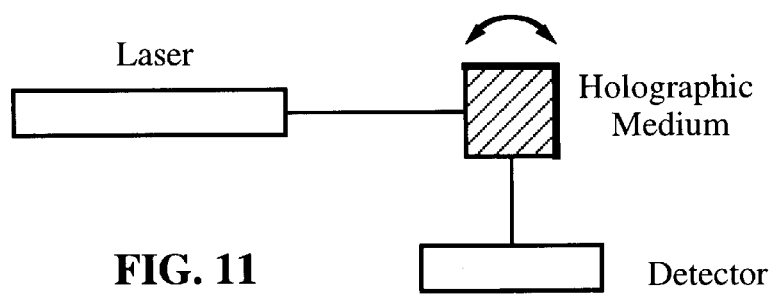
FIG. 11

SPATIO-ANGULAR MULTIPLEXING GEOMETRY FOR VOLUME HOLOGRAPHIC STORAGE

This invention was made with government support under Contract No. N00014-92-J1903 awarded by ARPA. The Government has certain rights in this invention.

FIELD OF THE INVENTION

The invention relates to the field of holographic data storage, and in particular to a novel holographic storage geometry using spatio-angular multiplexing.

DESCRIPTION OF PRIOR ART

Since the development of off-axis holography in the 1960's, volume holography has been identified as a candidate for high density data storage. Theoretically, up to $10^{14}$ bits of information can be stored in 1 cm$^3$ of a volume holographic medium. In addition, holographic storage promises fast data transfer rates, estimated at over 1 Gb/s. An underlying reason for the fast performance of holographic storage systems is that thousands of data bits are stored together in pages, rather than individually on a track. For information on holographic memory systems, see for example the articles by van Heerden in *Appl. Opt.* 2: 393 (1963), Heanue et al. in *Science* 265: 749–752 (1994), Hong et al. in *Opt. Eng.* 34(8): 2193–2203 (1995), and Psaltis and Mok in *Scientific American* 273(5): 70–78 (1995), or U.S. Pat. No. 4,927,220 (Hesselink et al.), herein incorporated by reference.

Briefly, in a typical volume holographic storage system data is stored in a photorefractive medium such as a lithium niobate (LiNbO$_3$) or strontium barium niobate (SBN) crystal. The data is encoded as a page in a coherent signal beam that is allowed to interfere with a coherent reference beam within the recording medium; the interference pattern corresponding to a page is stored throughout the medium. For readout, only the reference beam is sent through the medium, and the interaction of the reference beam with the stored interference pattern produces a signal beam proportional to the beam used to store the pattern.

Several approaches have been used for multiplexing, or storage of multiple pages within a system. Typical approaches include spatial, angular, wavelength and phase-code multiplexing. For an overview of these multiplexing techniques, see for example the article by Hesselink and Bashaw in *Opt. and Quant. Elect.* 25: S611 (1993), herein incorporated by reference. Angular multiplexing is perhaps the most widely used technique, and as many as 5,000 holograms have been recorded at a single location. For more information on angular multiplexing, see for example the articles by Mok in *Opt. Lett.* 18: 915 (1993) and by Mok et al. in *Opt. Lett.* 16: 605 (1991).

Spatial multiplexing is typically achieved by using an array of crystals, or by dividing a large crystal into smaller non-overlapping regions, and employing angular, wavelength or phase code multiplexing in each of the array elements or regions. For further information on spatial multiplexing, see for example the article by Hesselink in *Int. J. Optoelectronics* 5: 103 (1990), or the above-incorporated U.S. Pat. No. 4,927,220 (Hesselink et al.).

Several techniques combining spatial and angular multiplexing have been proposed for increasing data storage capacity in holographic storage systems. A geometry similar to that used in conventional magnetic or optical (CD) recording was proposed by Mikaelian et al. in *Proc. SPIE—Int. Soc. for Opt. Eng.* 1213: 2–6 (1990) and by Psaltis et al. in *Appl. Opt.* 29: 2038 (1990). In this approach, pages are stored as two-dimensional (2-D) holograms on a flat spinning circular disk in a transmission or reflection geometry. Different images are stored at different locations along the surface of the disk, as shown schematically in FIG. 1-A. Two holographic spots 10 and 12, each corresponding to a stored image, are separated by a distance $\Delta$ greater than the spot size d. A disadvantage of this approach is that, as in the case of CD players, a moving head is required. Moreover, the 90° geometry required for optimal angular selectivity cannot be successfully used with such an approach.

In an article in *Opt. Lett.* 18: 912 (1993), herein incorporated by reference, Tao et al. propose a system using overlapping spatial and angular multiplexing in a transmission geometry, and having higher potential storage density than an equivalent system using only spatial multiplexing. Different images are stored at overlapping locations in a crystal, as shown schematically in FIG. 1-B. Two holographic spots 14 and 16 in a two-dimensional array are separated by a distance $\Delta$ smaller than the spot sized. Crosstalk between overlapping images is reduced by recording spots 14 and 16 using reference beams incident on the holographic medium at slightly different angles. The Cartesian array system proposed by Tao et al. achieves high storage density through the use of continuous overlapping angular and spatial multiplexing, but requires the use of precision stepper-motor-driven translation and rotation stages or several acousto-optic beam deflection devices during recording and readout.

OBJECTS AND ADVANTAGES OF THE INVENTION

In light of the above, it is a primary object of the present invention to provide a volume holographic data storage apparatus that allows continuous overlapping spatio-angular multiplexing. It is another object of this invention to provide a system using spatial and angular multiplexing that does not require precision translation and rotation stages, beam deflection devices, or tunable lasers. It is yet another object of this invention to provide a spatio-angularly multiplexed system that can be implemented through the use of a single multiplexing motor or active device. These and other objects and advantages will become more apparent after consideration of the ensuing description and the accompanying drawings.

SUMMARY OF THE INVENTION

An apparatus of the present invention comprises at least one holographic storage element, rotation means for rotating the element about an element axis, and translation means for translating the element along the element axis. A reference beam and a signal beam are incident upon the medium and are perpendicular to the element axis. The c-axis of the medium is perpendicular to the element axis. In a preferred embodiment, the apparatus comprises a medium having a helically varying c-axis orientation. Such a medium can consist, in practice, of a plurality of stacked cylindrical elements, where the angle between the c-axes of any two adjacent cylinders is a non-zero constant $\alpha$. An external housing is provided for eliminating the aberration produced by the cylindrical surface. The housing is index-matched to the medium, and an index-matched material such as a liquid is inserted between the housing and the medium.

The need for a precision rotation stage is eliminated by selectively illuminating the medium with the reference beam, and thus retrieving a page, only when the page is Bragg-matched to the reference beam. The selective retrieval is achieved through the use of a beam access control means for controlling the access of the reference beam to the medium. The beam access control means comprises either an acousto-optic modulator for turning on and off the reference beam laser, or a shutter for shutting off the access of the reference beam to the medium.

Preferably, the apparatus further comprises a location selection means for controlling the part of the medium addressed by the reference beam. A location selection means can comprise, for example, a plate having an aperture of width w, where the width of the aperture is parallel to the element axis.

In a method of the present invention, a first data page is stored at a first location within the medium. The medium is rotated by an angle θ about the element axis and translated by a distance z along the element axis, and a second image is stored at a second location within the medium. The first and second locations are preferably overlapping, i.e. the distance z is less than the width w of the aperture used to control the reference beam addressing. Reference pages are stored within the medium to allow dynamic position calibration during readout.

BRIEF DESCRIPTION OF THE DRAWINGS

FIG. 1-A illustrates a prior art multiplexing approach using spatial multiplexing in a 2-D holographic storage medium.

FIG. 1-B illustrates a prior art multiplexing approach using overlapping spatio-angular multiplexing in a 2-D holographic storage medium.

FIG. 2 shows an arrangement for a 3-D holographic storage system of the present invention.

FIG. 3-A is a perspective view of a holographic storage medium using continuous spatial and angular multiplexing, according to the present invention.

FIG. 3-B is a longitudinal sectional view of the medium of FIG. 3-A.

FIG. 3-C is a transverse sectional view of the medium of FIG. 3-A.

FIG. 7-A illustrates a setup for implementing dynamic sequential page readout, according to the present invention.

FIG. 7-B shows qualitatively the output of the photodetector in FIG. 7-A as a function of time.

FIG. 8-A is a perspective view of a cylindrical holographic storage medium having a helically-varying c-axis direction, according to the present invention.

FIG. 8-B illustrates a possible practical implementation of the medium of FIG. 4-A, having stacked thin disks with uniform individual c-axis directions.

FIG. 9 illustrates a motor system in one embodiment of the present invention.

FIG. 10-A illustrates the use of a medium of the present invention in a Q-switching device in a 180° geometry.

FIG. 10-B illustrates the use of a medium of the present invention in a Q-switching device in a 90° geometry.

FIG. 11 illustrates the use of a medium of the present invention in a reference and synchronization device.

DESCRIPTION

Figure 4:
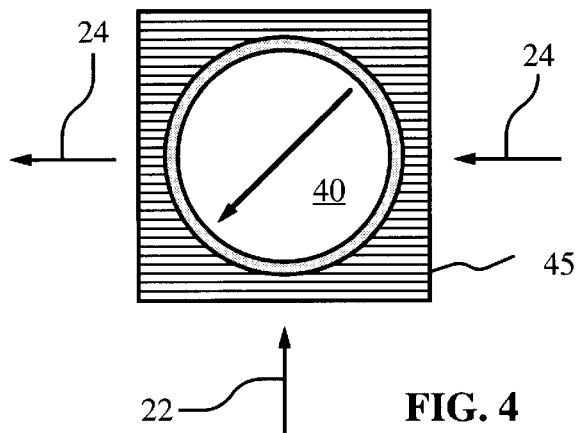
FIG. 4 is a transverse sectional view through a holographic medium placed in an index-matched enclosure, according to the present invention.

In the ensuing description, the statement that a first material is index-matched to a second material is understood to mean that a difference between an index of refraction of the first material and an index of refraction of the second material is less than 10% of the index of refraction of the second material. The statement that a beam/axis is substantially perpendicular to a second axis is understood to mean that the angle between the beam/axis and the second axis is 90±10 degrees.

FIG. 2 shows schematically a setup for a 3-D holographic storage system of the present invention. Information is recorded in a recording medium 20 as a 3-D interference pattern produced by a reference beam 22 and a signal beam 24. Signal beam 24 contains the information (e.g. data pages) to be stored. A coherent light source such as a laser 26 generates a monochromatic beam that is split by a beam splitter 28 into reference beam 22 and signal beam 24. Preferably, reference beam 22 is perpendicular to signal beam 24 within holographic medium 20, so as to minimize crosstalk due to Bragg-mismatched reconstruction.

Reference beam 22 and signal beam 24 are spatially manipulated and Fourier transformed using mirrors and lenses, as is apparent to the skilled artisan. Typical optics used with holographic storage systems, and ways of spatially manipulating and Fourier transforming beams are well known in the art. Information is encoded in signal beam 24 using an Amplitude Spatial Light Modulator (ASLM) 30, which selectively lets light pass through its light pixels. An ASLM suitable for use with a method of the present invention is for example an electronically addressable liquid-crystal array having 480×440 pixels, such as an array used in an InFocus TVT-6000 video projector.

FIG. 3-A is a more detailed perspective view of a holographic storage medium similar to the one shown in FIG. 2, while FIGS. 3-B and 3-C show, respectively, longitudinal and transverse sectional views of the medium of FIG. 3-A. The medium shown in FIG. 3-A comprises an element 40 having a longitudinal element axis 42 and a c-axis 44, as shown in FIGS. 3-B and 3-C. Element axis 42 is perpendicular to the plane defined by the reference and signal beams. C-axis 44 is substantially perpendicular to element axis 42.

A location selection means 46 controls the vertical extent of element 40 addressed by reference beam 22. For simplicity of presentation, location selection means is shown in FIG. 3-A only in the reference beam path. It is preferred, however, that the signal beam vertical extent also be controlled by a location selection means, as illustrated in FIG. 3-C. Location selection means 46 comprises at least one aperture of width w. A page is then stored in an extent w of element 40, where the extent w is along element axis 42. If parallel readout of multiple holograms is desired, means 46 preferably comprises multiple vertically stacked apertures. A camera 48 is used to readout the stored holograms. Preferably, camera 48 is a CCD array.

A reference beam access control means 50 is preferably used to shut off the access of reference beam 22 to element 40 between the readout of data pages. Preferably, means 50 is either a shutter in the reference beam path, or an acousto-optical modulator controlling the reference beam source.

The presence of means 50 is desirable because, if the stored holograms are not fixed or rendered non-volatile, each time increment of medium exposure to the reference beam leads to a decay in hologram strength.

Moreover, there is a camera integration time that can influence the camera output. As a consequence of the nonzero integration time, in a fast-spinning system the readout signal corresponding to a given page can be affected by neighboring pages, if readout is allowed when pages are not exactly Bragg-matched with the reference beam. The access of the signal beam to camera 48 can be controlled either by means 50, or by a signal beam access control means 52 placed in the signal beam path.

Consider a section through element 40 transverse to the element axis, as shown in FIG. 3-C. It is preferred that, for such a section, c-axis 44 lie in the section plane. That is, element 40 is preferably an a-axis rod or disk. It is further preferred that the angle between c-axis 44 and reference beam 22 be approximately 45° during storage and readout of data.

The cross section of element 40 can be in general of any shape. For example, the cross section can be a rectangle, in which case element 40 comprises a parallelepiped. It is preferred, however, for simplicity and symmetry, that element 40 be a cylinder. The cylindrical symmetry has the advantage that it does not lead to the image shift common with cubic crystals.

A disadvantage of a cylindrical element, if used alone, is that the element acts essentially as a lens. The aberration introduced by the cylindrical surface can be reduced, however, by placing the cylindrical element in an index-matched rectangular housing 45 having a central bore, as shown in FIG. 4. Housing 45 also serves to mechanically protect element 40. The cylinder axis is parallel to the bore axis, and element 40 is allowed to freely rotate within housing 45. An index-matched material such as a liquid can also be inserted between the housing and the element, in order to reduce reflection, scatter and lensing effects.

A motor system is connected to element 40, and serves to rotate and translate element 40 relative to element axis 42. The rotation and translation of element 40 are controlled by a position control means connected to the motor system. Preferably, the position control means comprises computer software; in general, however, a combination of hardware and software control means, or hardware means can be used. Note that it is only required that element 40 rotate and translate relative to the reference beam. It is also possible to rotate a mirror in a telecentric arrangement about element 40. For simplicity, however, it is preferred that element 40 rotate.

In a preferred embodiment of the present invention, the motor system comprises two independent motors. A first motor is used to rotate, and a second motor to translate element 40. The independence of rotation and translation results in reduced access times, and allows a mode of operation in which element 40 is continuously spinning at high velocity.

To understand the operation of an apparatus of the present invention, consider first an apparatus employing angular multiplexing alone in a single-element medium having a uniform c-axis orientation. Consider a portion of element 40 having an extent w along element axis 42. There will be a maximum number M of holograms that can be stored in such a portion by angular multiplexing alone, given crosstalk and signal-to-noise ratio (SNR) constraints. If each such hologram contains N bits, the number of bits stored in a length w of element 40 is N×M, in the absence of spatial multiplexing. The number M, defined by characteristics of a system using angular multiplexing alone, can also be used as an estimate of the number of pages that can be stored (per length w) in a system using overlapping spatio-angular multiplexing. Thus, a crystal of length l will have a storage capacity (in bits)

$$C = MN\frac{l}{w} .\qquad [1]$$

Figure 5:
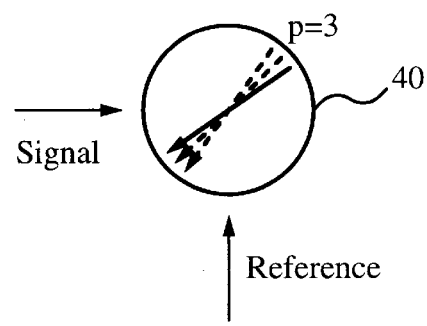
FIG. 5 is a transverse sectional view of the medium of FIG. 3-C, illustrating the orientation of the medium during the storage/readout of three consecutive pages.

Since it is preferred that the angle between reference beam 22 and c-axis 44 be approximately 45°, it is not possible to store holograms at constant angular intervals for a full revolution. Instead, a number p of holograms are stored, per revolution, only within a suitable angular range around the 45° element orientation, as illustrated in FIG. 5 for p=3. Ways to determine optimal angular spacings are known in the art.

Consider now overlapping spatio-angular multiplexing. In a preferred mode of operation, medium 20 continuously rotates about its axis at a rate of Ω revolutions per second, and moves along the axis with a velocity v. If the translation is continuous, a given point in medium 20 is illuminated for a time t=w/v seconds in the absence of beam access control means 50. Note that, as suggested above, it is also possible to rotate medium 20 at a fixed vertical location, and translate reference beam 22 instead.

Figure 6:
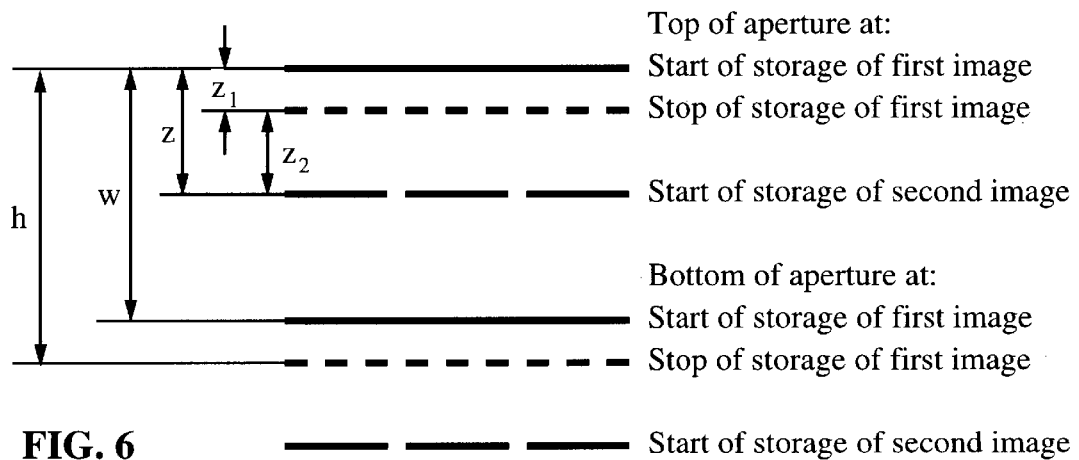
FIG. 6 illustrates qualitatively the relationships between several translation distances defined in a method of the present invention.

In the preferred mode of operation, a first page is stored at a first location in medium 20. The location has a longitudinal extent h=w+$z_1$, where w is the aperture of location selection means 46 and $z_1$ is the translation distance during the storage of the first image. During the storage of the first image, medium 20 is rotated by an angle $\theta_1$. Medium 20 is rotated by an angle $\theta_2$ and translated by a distance $z_2$ without storage, and a second page is stored at a second location of medium 20. Between the start of the storage of consecutive pages, medium 20 is rotated by a total angle $\theta=\theta_1+\theta_2$ and translated by a total distance $z=z_1+z_2$. Preferably, consecutive images are overlapping, i.e. z<h, or equivalently $z_2$<w. FIG. 6 qualitatively illustrates the relationships between h, w, z, $z_1$ and $z_2$ for overlapping storage with $z_1 \neq 0$.

During the readout of the first page, medium 20 is again rotated by an angle $\theta_1$ and translated by a distance $z_1$. Medium 20 is rotated by an angle $\theta_2$ and translated by a distance $z_2$ without storage, and a second page is read out from a second location of medium 20.

In another mode of operation, a first page is stored at a first location having an extent h=w. That is, in this mode of operation, $\theta_1$=0 and $z_1$=0. Medium 20 is then rotated by an angle $\theta_2$ and translated by a distance $z_2$ without storage. In this mode of operation, $\theta=\theta_2$ and $z=z_2$. Readout occurs in a manner similar to the one described for the preferred mode of operation.

If M images are to be stored per length w of medium 20, and p pages are stored per revolution, the average translation velocity during storage is $$v = \frac{p\Omega w}{M} .\qquad [2]$$

For but-of-sequence storage or readout, the average translation velocity is given by eq. [2], with p=1 if one image is stored or read out per revolution.

If v and Ω are taken to be average values in equation [2], the relation holds also for the mode of operation in which the medium rotates only between the storage of pages ($z_1$=0).

During readout, it is possible to specify the positions of stored pages using primarily the position control means.

That is, the locations of stored pages are retrieved from memory. Preferably, the positioning of medium 20 relative to signal beam 22 is refined using signals from calibrated reference pages stored at several positions in medium 20. A reference page is any page whose content is known before readout; a reference page can comprise, for example, an array of bits all equal to 1. Storing page locations in memory is particularly useful for non-sequential readout.

An apparatus of the present invention can be used to implement dynamic sequential page readout, i.e. readout without exact prior knowledge of hologram positions. A setup that can be used to implement dynamic sequential readout is shown in FIG. 7-A. A beam splitter splits the signal beam between camera 48 and a photodetector 80. Photodetector 80 reports the average intensity of the signal beam to a signal feedback means 82. A typical output of photodetector 80 during readout in the continuous-rotation mode of operation is qualitatively shown in FIG. 7-B, as a function of time. Signal feedback means 82 directs the start of integration at camera 48, or alternatively the opening of signal beam access control means 52, when photodetector 80 detects an increase in the average intensity of the signal beam.

For a system employing a single element (such as a long rod) with a uniform c-axis orientation, maintaining approximately a 45° angle between reference beam 22 and c-axis 44 prevents the storage of images at constant angular intervals for a full revolution. As a result, a large part of a revolution period is not spent for storage or readout, but rather for resetting the angular orientation of the medium.

Continuously maintaining a 45° angle between the local c-axis and the reference beam as the medium is spinning and moving vertically would require that the c-axis orientation vary continuously within a medium 90, as shown in a perspective view in FIG. 8-A. The ideal medium shown in FIG. 8-A can be approximated by a series of stacked elements 92, as shown in a simplified perspective view in FIG. 8-B. For clarity of presentation, only four of the elements in a full series are illustrated in FIG. 8-B. The angle between the c-axes of any two adjacent stacked elements 92 has a non-zero value $\alpha$. Note that, in a system using a medium such as the one shown in FIG. 8-B, it is desirable to minimize the scatter from the interfaces between stacked elements.

The dead time required for resetting the angular orientation of the medium is eliminated with the use of a medium similar to the ones shown in FIGS. 8-A and 8-B. In such a medium, pages are stored at constant angular intervals for any full revolution. The readout time is reduced for sequential readout applications, such as applications involving video image storage. For non-sequential readout, however, the one-page-per-revolution requirement is in general not eliminated.

A motor system used with a medium such as the ones in FIGS. 8-A and 8-B preferably comprises a single motor for both translating and rotating element 40. FIG. 9 is a side view of a motor system comprising a single motor 60. The system is mounted on a fixed support 62. Element 40 is attached to the shaft of motor 60 through a transmission element 64. Preferably, transmission element 64 comprises a threaded screw going through a tapped hole 66. In general, however, a transmission element of the present invention is any element which couples the rotation and translation means. Preferably, the coupling is such that rotation and translation are controlled by a single active device or motor.

The rotation of the motor shaft causes motor 60 and element 40 to translate vertically (along the element axis) relative to support 62. Motor 60 is mounted on a beam 68 which slides along rails 72. A gear system (not shown) can be used to vary the rotation velocity of screw 62 if motor 60 has a fixed rotation velocity. The translation velocity v is controlled by $\Omega$ and the pitch of screw 64.

Typical parameters of a storage system of the present invention can be determined from eqs. [1] and [2]. Consider for example an element having a cross-sectional area on the order of 1 cm². Take N=$10^6$ bits, w=1 mm, M=500 holograms, and p=M. Fifty gigabits (50,000 pages) can then be stored in a rod of length l=10 cm. This storage capacity corresponds to about half an hour of uncompressed video. The translation velocity for $\Omega$=1 Hz is v=1 mm/s.

The storage capacity of an apparatus of the present invention can be increased by several techniques. For example, for video applications the data is compressed before storage and decompressed following readout. Multiple crystal rods can be used. That is, an apparatus of the present invention can comprise a second storage medium similar to the one described above. In a system of the present invention used in a video player it is possible to employ three rods, each rod corresponding to a different color. The system transfer rate can be increased by parallel storage/readout, i.e. by the presence of a second location selection means.

A geometry of the present invention can be used for applications other than data storage. A Q-switching device can be built employing a geometry such as the ones shown in FIGS. 10-A and 10-B. The Bragg selectivity of the medium determines the spectral width of the laser, while the rate at which the motor rotates determines the pulse duration and the time between pulses. A highly accurate reference and synchronization device can be used to precisely determine angular position and velocity, by employing the 90° geometry shown in FIG. 11. The Bragg selectivity in the 90° arrangement is on the order of $10^{-5}$ radians. A series of calibrated gratings stored in the holographic medium provide accurate information on the system position.

SUMMARY, RAMIFICATIONS, AND SCOPE

There are many ways to build a holographic storage apparatus using spatio-angular multiplexing, without departing from the spirit of the invention. Therefore, the scope of the invention should be determined, not by examples given, but by the appended claims and their legal equivalents.

We claim:

1. A holographic data storage system comprising:
   a) a volume holographic storage medium having a longitudinal axis and a c-axis in a plane substantially perpendicular to said longitudinal axis, said c-axis having a helically-varying orientation along said longitudinal axis; and
   b) optics for establishing a reference beam and a signal beam incident on said medium for storing multiple data pages therein.

2. The system of claim 1 wherein said medium comprises adjacent elements stacked along said longitudinal axis and having respective c-axis orientations separated by a non-zero angle $\alpha$.

3. The system of claim 1 wherein said reference beam and said signal beam are incident on said medium such that a plane defined by said reference beam and said signal beam is substantially perpendicular to said longitudinal axis.

4. The system of claim 1 further comprising a position control device for rotating said medium about said longitudinal axis and translating said medium along said longitudinal axis.

5. The system of claim 1 further comprising a rotation device for rotating said medium about said longitudinal axis.

6. A holographic data storage method in a volume holographic storage medium comprising the steps of:
   a) establishing in said medium a longitudinal axis and a c-axis in a plane substantially perpendicular to said longitudinal axis;
   b) establishing a helically-varying orientation of said c-axis along said longitudinal axis; and
   c) storing multiple data pages in said medium by directing a reference beam and a signal beam on said medium.

7. The storage method of claim 6 wherein said multiple data pages are stored by overlapping spatio-angular multiplexing such that, between storage of consecutive data pages, said medium is rotated about said longitudinal axis and translated along said longitudinal axis.

8. The storage method of claim 6 wherein said rotation and said translation are performed continuously.

9. The storage method of claim 6 wherein said signal beam and said reference beam are contained in a plane maintained substantially perpendicular to said longitudinal axis.

10. A holographic data retrieval method from a volume holographic storage medium comprising the steps of:
    a) establishing in said medium a longitudinal axis and a c-axis in a plane substantially perpendicular to said longitudinal axis;
    b) establishing a helically-varying orientation of said c-axis along said longitudinal axis; and
    c) retrieving multiple data pages from said medium by directing a reference beam on said medium.

11. The retrieval method of claim 10 wherein said multiple data pages are retrieved while said medium is rotated about said longitudinal axis and translated along said longitudinal axis.

12. The retrieval method of claim 10 wherein said rotation and said translation are performed continuously.

13. The retrieval method of claim 10 wherein said reference beam is maintained substantially perpendicular to said longitudinal axis.

\* \* \* \* \*